US012727004B2

(12) United States Patent
Liu et al.

(10) Patent No.: US 12,727,004 B2
(45) Date of Patent: Sep. 1, 2026

(54) SYSTEMS AND METHODS OF GROUP COMMON TRANSMISSION

(71) Applicant: ZTE CORPORATION, Shenzhen (CN)

(72) Inventors: Xing Liu, Shenzhen (CN); Peng Hao, Shenzhen (CN); Xingguang Wei, Shenzhen (CN); Shuaihua Kou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 229 days.

(21) Appl. No.: 18/521,793

(22) Filed: Nov. 28, 2023

(65) Prior Publication Data

US 2024/0114525 A1 Apr. 4, 2024

Related U.S. Application Data

(63) Continuation of application No. PCT/CN2021/110821, filed on Aug. 5, 2021.

(51) Int. Cl.
*H04W 72/232* (2023.01)
*H04L 5/00* (2006.01)

(52) U.S. Cl.
CPC ......... *H04W 72/232* (2023.01); *H04L 5/0053* (2013.01)

(58) Field of Classification Search
CPC .... H04L 5/0053; H04W 72/25; H04W 72/27; H04W 72/29; H04W 72/23
See application file for complete search history.

(56) References Cited

U.S. PATENT DOCUMENTS

| | | | |
|---|---|---|---|
| 2020/0008235 A1 | 1/2020 | Sarkis et al. | |
| 2020/0106559 A1 | 4/2020 | Vilaipornsawai et al. | |
| 2020/0153497 A1 | 5/2020 | Tsai et al. | |
| 2020/0154467 A1 | 5/2020 | Gong et al. | |
| 2020/0351840 A1 | 11/2020 | Zhou et al. | |
| 2023/0039536 A1* | 2/2023 | Liu | H04L 5/0092 |

(Continued)

FOREIGN PATENT DOCUMENTS

| | | |
|---|---|---|
| CN | 109391361 A | 2/2019 |
| CN | 110535596 A | 12/2019 |

(Continued)

OTHER PUBLICATIONS

Extended European Search Report for EP Appl. No. 21952296.8, dated Jul. 12, 2024 (12 pages).

(Continued)

*Primary Examiner* — Brian P Cox
(74) *Attorney, Agent, or Firm* — Foley & Lardner LLP

(57) ABSTRACT

Systems and methods for wireless communication systems are disclosed. In one aspect, the wireless communication method includes sending, by a network to a wireless communication device, first signaling for monitoring at least one downlink control channel, the at least one downlink control channel comprises a first downlink control channel and a second downlink control channel. The second downlink control channel comprises a retransmission of the first downlink control channel. The method includes sending, by the network to a plurality of wireless communication devices comprising the wireless communication device, the at least one downlink control channel.

17 Claims, 15 Drawing Sheets

(56) References Cited

U.S. PATENT DOCUMENTS

2023/0085875 A1* 3/2023 Li .................... H04W 72/0446
370/336
2023/0327808 A1* 10/2023 Mu .......................... H04L 1/08
714/748

FOREIGN PATENT DOCUMENTS

WO WO-2021/022736 A1 2/2021
WO WO-2023/014541 A1 2/2023

OTHER PUBLICATIONS

Qualcomm Incorporated, "View on group scheduling for Multicast RRC_CONNECTED UEs", 3GPP TSG RAN WG1 #105-e, R1-2104695, May 27, 2021, e-Meeting (10 pages).

International Search Report and Written Opinion for PCT Appl. No. PCT/CN2021/0110821, dated Mar. 28, 2022 (8 pages).

Communication pursuant to Article 94(3) EPC on EP Appl. No. 21952296.8 dated Jan. 2, 2026 (8 pages).

* cited by examiner

SYSTEMS AND METHODS OF GROUP COMMON TRANSMISSION

CROSS-REFERENCE TO RELATED APPLICATION

This application claims the benefit of priority under 35 U.S.C. § 120 as a continuation of PCT Patent Application No. PCT/CN2021/110821, filed on Aug. 5, 2021, the disclosure of which is incorporated herein by reference in its entirety.

TECHNICAL FIELD

The disclosure relates generally to wireless communication, including but not limited to systems and methods of group common transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions (NFs), have been simplified with some of them being software based so that they could be adapted according to need.

SUMMARY

One aspect is a wireless communication method including sending, by a network to a wireless communication device, first signaling for monitoring at least one downlink control channel, the at least one downlink control channel includes a first downlink control channel and a second downlink control channel. The second downlink control channel includes a retransmission of the first downlink control channel. The method includes sending, by the network to a plurality of wireless communication devices including the wireless communication device, the at least one downlink control channel.

In some embodiments, the first signaling includes to a first Control Resource Set (CORESET) and a second CORESET, the first CORESET corresponds with the first downlink control channel for the wireless communication device; and the second CORESET corresponds with the second downlink control channel for the wireless communication device.

In some embodiments, the first downlink control channel is an activation GC Physical Downlink Control Channel (PDCCH), the second downlink control channel is a reactivation PDCCH, and reactivation PDCCH is common to the plurality of wireless communication devices or specific to the wireless communication device.

In some embodiments, the method further includes sending, by the network to the wireless communication device, a first Transmission Configuration Indicator (TCI) state set and a second TCI state set via second signaling. The first TCI state set is associated with the first CORESET, and the second TCI state set is associated with the second CORESET.

In some embodiments, the method further includes sending, by the network to the wireless communication device, third signaling indicating a first TCI state from the first TCI state set and a second TCI state from the second TCI state set.

In some embodiments, the second signaling includes Radio Resource Control (RRC) signaling, and the third signaling includes Media Access Control (MAC) layer signaling or downlink control information (DCI).

In some embodiments, the first signaling includes to a CORESET, and the same CORESET corresponds with the first downlink control channel and the second downlink control channel for the wireless communication device.

In some embodiments, the method further includes sending, by the network to the wireless communication device, a TCI state set associated with the CORESET.

In some embodiments, the method further includes sending, by the network to the wireless communication device, third signaling indicating a first TCI state and a second TCI state from the TCI state set. The first TCI state maps with the first downlink control channel, and the second TCI state maps with the second downlink control channel.

In some embodiments, a mapping between the first and second TCI states with the first downlink control and the second downlink control channel is predefined or configured by the network.

In some embodiments, the method further includes configuring, by the network for the wireless communication device, a monitoring window for monitoring the second downlink control channel according to a time domain position of the at least one downlink control channel, a time domain position of a monitoring occasion for the at least one downlink control channel, a time domain position of a downlink shared channel scheduled by the at least one downlink control channel, a time domain position of a feedback resource for the at least one downlink control channel, or a time domain position of a feedback resource for the downlink shared channel scheduled by the at least one downlink control channel.

In some embodiments, the wireless communication device starts or stops monitoring the second downlink control channel based on at least one of: whether the wireless communication device receives the first downlink control channel; whether the wireless communication device starts to receive Semi Persistent Scheduling (SPS)-based services; or whether the wireless communication device receives an SPS downlink channel.

In some embodiments, the wireless communication device determines a Blind Detect (BD) number based on whether the wireless communication device monitoring the second downlink control channel.

Another aspect is a wireless communication apparatus including at least one processor and a memory. The at least one processor is configured to read code from the memory and implement a wireless communication method including sending, by a network to a wireless communication device, first signaling for monitoring at least one downlink control channel, the at least one downlink control channel includes a first downlink control channel and a second downlink control channel. The second downlink control channel includes a retransmission of the first downlink control channel. The method includes sending, by the network to a plurality of wireless communication devices including the wireless communication device, the at least one downlink control channel.

Another aspect is a computer program product including a computer-readable program medium code stored thereupon, the code, when executed by at least one processor, causing the at least one processor to implement a wireless communication method including sending, by a network to a wireless communication device, first signaling for monitoring at least one downlink control channel, the at least one downlink control channel includes a first downlink control channel and a second downlink control channel. The second downlink control channel includes a retransmission of the first downlink control channel. The method includes sending, by the network to a plurality of wireless communication devices including the wireless communication device, the at least one downlink control channel.

Another aspect is a wireless communication method, including receiving, by a wireless communication device from a network, first signaling for monitoring at least one downlink control channel, the at least one downlink control channel includes a first downlink control channel and a second downlink control channel; and receiving, by the wireless communication device from the network, the at least one downlink control channel.

In some embodiments, the first signaling includes to a first CORESET and a second CORESET, the first CORESET corresponds with the first downlink control channel for the wireless communication device, and the second CORESET corresponds with the second downlink control channel for the wireless communication device.

In some embodiments, the first signaling includes to a CORESET; and the same CORESET corresponds with the first downlink control channel and the second downlink control channel for the wireless communication device.

In some embodiments, the wireless communication device is configured by the network a monitoring window for monitoring the second downlink control channel according to a time domain position of the at least one downlink control channel, a time domain position of a monitoring occasion for the at least one downlink control channel, a time domain position of a downlink shared channel scheduled by the at least one downlink control channel, a time domain position of a feedback resource for the at least one downlink control channel, or a time domain position of a feedback resource for the downlink shared channel scheduled by the at least one downlink control channel.

In some embodiments, the wireless communication method further includes determining, by the wireless communication device, whether to monitor the second downlink control channel based on at least one of: whether the wireless communication device receives the first downlink control channel; whether the wireless communication device starts to receive SPS-based services; or whether the wireless communication device receives an SPS downlink channel.

In some embodiments, the wireless communication method further includes starting determining, the wireless communication device, a BD number based on whether the wireless communication device monitoring the second downlink control channel.

Another aspect is a wireless communication apparatus including at least one processor and a memory. The at least one processor is configured to read code from the memory and implement a wireless communication method including sending, by a network to a wireless communication device, first signaling for monitoring at least one downlink control channel, the at least one downlink control channel includes a first downlink control channel and a second downlink control channel. The second downlink control channel includes a retransmission of the first downlink control channel. The method includes sending, by the network to a plurality of wireless communication devices including the wireless communication device, the at least one downlink control channel.

Another aspect is a computer program product including a computer-readable program medium code stored thereupon, the code, when executed by at least one processor, causing the at least one processor to implement the method recited in a wireless communication method including sending, by a network to a wireless communication device, first signaling for monitoring at least one downlink control channel, the at least one downlink control channel includes a first downlink control channel and a second downlink control channel. The second downlink control channel includes a retransmission of the first downlink control channel. The method includes sending, by the network to a plurality of wireless communication devices including the wireless communication device, the at least one downlink control channel.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
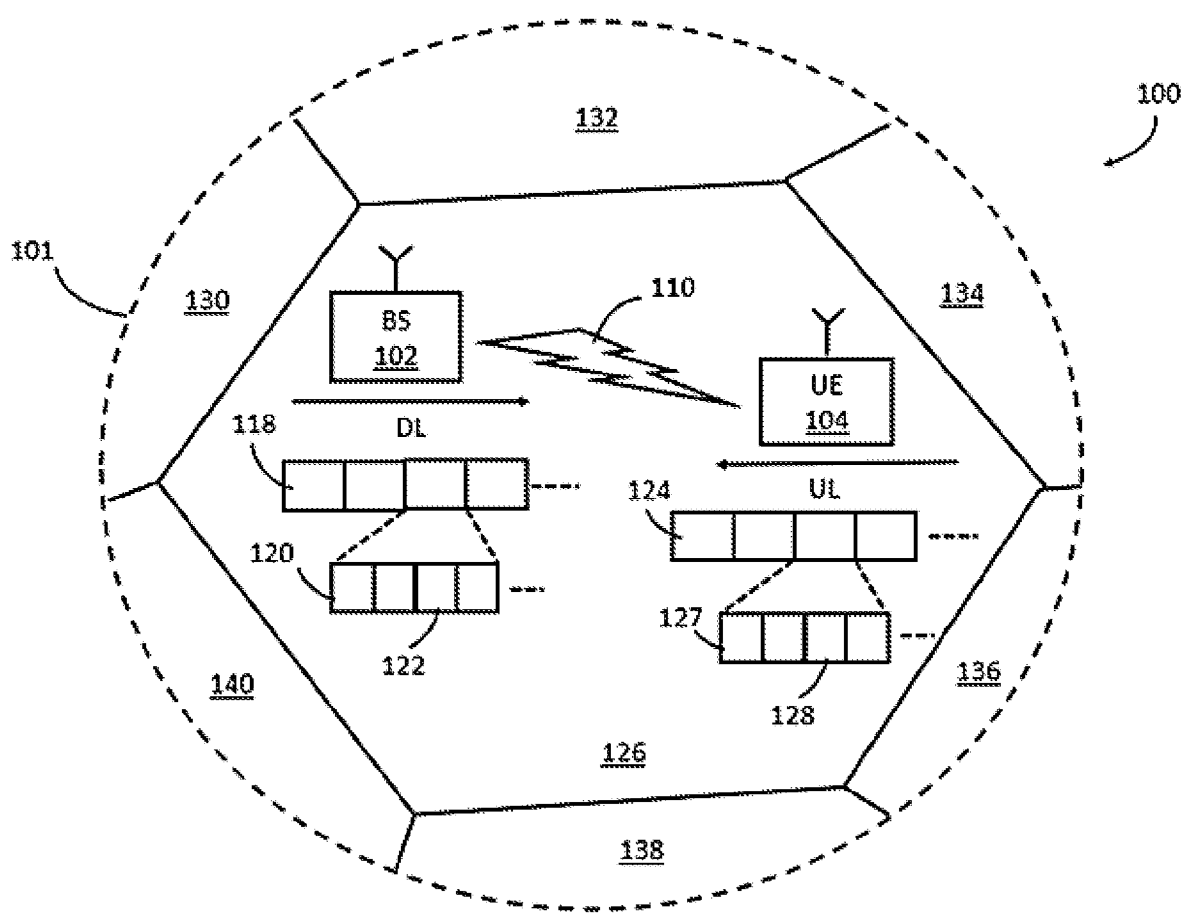
FIG. 1 illustrates an example wireless communication system in which techniques disclosed herein can be implemented, in accordance with some embodiments of the present disclosure.

FIG. 1 illustrates an example wireless communication system 100 in which techniques disclosed herein can be implemented, in accordance with some embodiments of the present disclosure. In the following discussion, the wireless communication system 100 may implement any wireless network, such as a cellular network or a narrowband Internet of things (NB-IoT) network. Such an example system 100 includes a base station (BS) 102 (also referred to as a wireless communication node) and UE 104 (also referred to as a wireless communication device) that can communicate with each other via a communication link 110 (e.g., a wireless communication channel), and a cluster of cells 126, 130, 132, 134, 136, 138 and 140 overlaying a geographical area 101. In some examples, a network refers to one or more BSs (e.g., the BS 102) in communication with the UE 104, as well as backend entities and functions (e.g., a LMF). In other words, the network refers to components of the system 100 other than the UE 104. In FIG. 1, the BS 102 and UE 104 are included within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
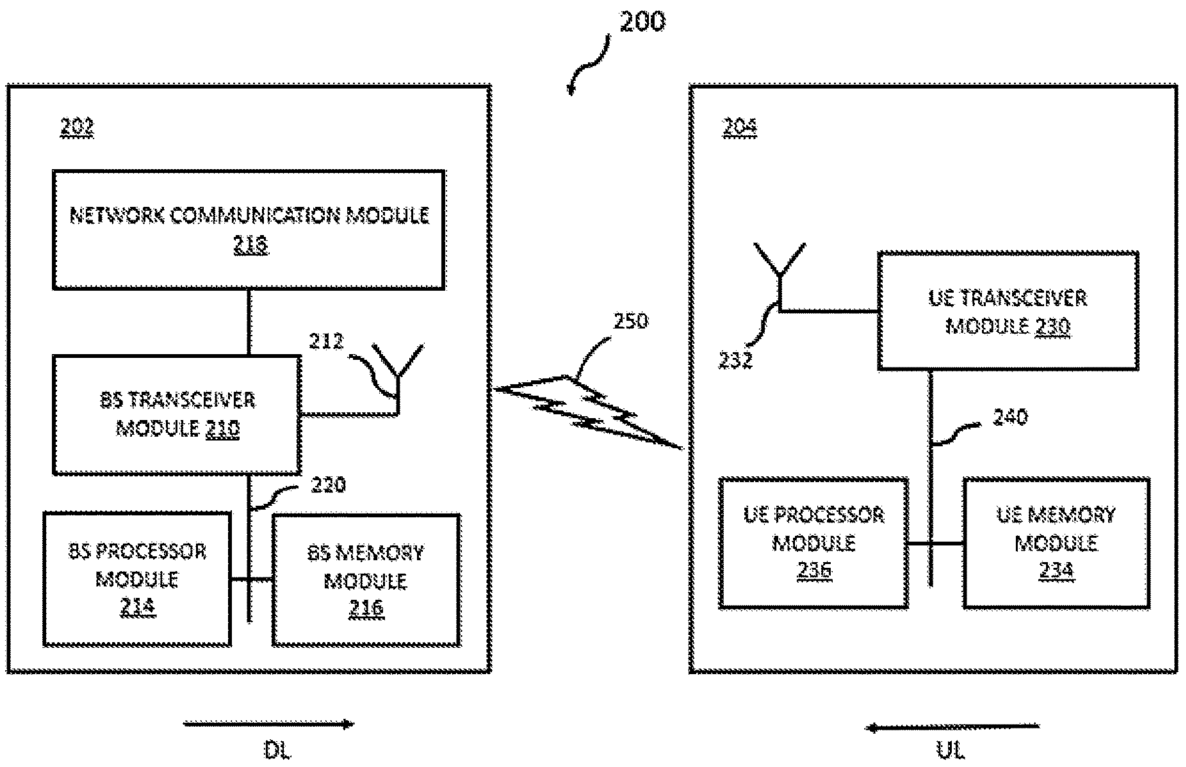
FIG. 2 illustrates a block diagram of an example wireless communication system for transmitting and receiving wireless communication signals (e.g., orthogonal frequency-division multiplexing (OFDM) or orthogonal frequency-division multiple access (OFDMA) signals) in accordance with some embodiments of the present disclosure.

FIG. 2 illustrates a block diagram of an example wireless communication system 200 for transmitting and receiving wireless communication signals (e.g., OFDM or OFDMA signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the system 100 of FIG. 1, as described above.

System 200 generally includes a base station 202 (hereinafter "BS 202") and a user equipment device 204 (hereinafter "UE 204"). The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a MAC layer. In some embodiments, a third layer may be a Radio Link Control (RLC) layer. In some embodiments, a fourth layer may be a Packet Data Convergence Protocol (PDCP) layer. In some embodiments, a fifth layer may be a RRC layer. In some embodiments, a sixth layer may be a Non Access Stratum (NAS) layer or an Internet Protocol (IP) layer, and the seventh layer being the other layer.

The First Phase Standardization of the 5th Generation Mobile Communication Technology (5G) has already been completed. There is a series of unicast features in 5G, but there is no support yet for broadcast/multicast features.

Under the mode of MBS (Multicast Broadcast Service), the same transmission mechanism can be used by the network node (e.g. a base station) for transmitting the same information to a group of UEs or all UEs in a cell. The MBS transmission can be carried on a physical downlink shared channel (PDSCH) which is received by the group of UEs or all UEs. So the PDSCH carrying MBS information can be called a group-common (GC) PDSCH or MBS PDSCH. For example, there are various network environments (e.g. channel condition) for different UEs. For improving efficiency of MBS transmission, UEs with similar network environment can be expected to be classified into one UE group. Then, the transmission mechanism selected can be better matched to the network environment of each UE in the UE group.

According to a group of UEs receiving the same GC PDSCH for MBS information, there are different ways for scheduling the GC PDSCH for the group of UEs. One way is that the GC PDSCH is scheduled by a GC PDCCH dynamically, e.g., all UEs in the group will detect the same GC PDCCH, and decode the GC PDSCH according to the GC PDCCH.

Another way is that the GC PDSCH can be transmitted in a SPS manner, that is, some of the transmission parameters of the GC PDSCH are configured semi-statically by RRC signaling, e.g., transmission period, feedback resource, etc. And the SPS transmission can be activated or deactivated by an activation or deactivation PDCCH, respectively. The activation PDCCH can indicate activation command, including other parameters for GC PDSCH transmission, e.g., time domain resource allocation, frequency domain resource allocation, feedback timing (kl), etc. This mode can be called a SPS-based MBS transmission mode or SPS-based GC PDSCH transmission. The activation command can be transmitted by either a GC activation PDCCH or a UE-specific activation PDCCH.

No matter which GC PDSCH transmission mode is used, there is a need for a well-designed the PDCCH used for scheduling or activating GC PDSCH.

In some embodiments, the MBS and the unicast can coexist in a cell. Their frequency domain transmission range can be determined as follows. The base station can configure a frequency domain transmission range for the MBS service through system information on Broadcast Channel (BCCH) or multicast control information on Multicast Control Channel (MCCH). The frequency domain transmission range can be called a common frequency resource (CFR) or MBS bandwidth part (BWP). The UEs under RRC_IDLE/INACTIVE states can receive the MBS service within the configured CFR, and receive the information such as synchronization signal block (SSB)/system information block (SIB)/paging within the frequency domain range of CORESET #0.

In some embodiments, the UE can transmit an indication on whether it is receiving the broadcast service. This indication can provide a reference for the base station to configure/determine the first active downlink BWP. The indication can be transmitted during the process of accessing the network or entering the RRC_CONNECTED state from the RRC_IDLE/INACTIVE states, for example, via first message (MSG1) or third message (MSG3).

In some embodiments, after a UE receiving the broadcast service enters RRC_CONNECTED state, if the UE is configured with the first active downlink BWP through firstActiveDownlinkBWP-Id, it can receive the unicast on the first active downlink BWP configured and receive the broadcast within the CFR. In some embodiments, the first active downlink BWP indicated by the firstActiveDownlinkBWP-Id can contain CFR in the frequency domain so as to ensure that the broadcast reception of the UE is not affected. In some embodiments, the first active downlink BWP indicated by the firstActiveDownlinkBWP-Id can also be CFR. At this time, the CFR can occupy a BWP ID, which is also configured in the system information or multicast control information.

If the UE is not configured with the first active downlink BWP, then if the CFR is included by initial BWP configured by SIB1, the first active downlink BWP after the UE enters RRC_CONNECTED state can be the initial BWP configured by SIB1. At this time, the frequency domain range of the MBS received by the UE is the CFR, and the frequency range of the unicast received by the UE is SIB1 configured initial BWP.

In some embodiments (e.g., CFR includes the initial BWP configured by SIB1, or partially overlaps with the initial BWP configured by SIB1), after the UE enters the RRC_CONNECTED state, the first active downlink BWP can be the CFR. In this case, the frequency domain range of the UE receiving multicast and unicast is the CFR.

The resources for GC PDCCH transmission can be jointly determined by both of the configuration of search space and CORESET associated with the search space.

One or more CORESETs may be configured for a UE for monitoring PDCCH. Each CORESET can include one or more resource blocks (RBs) in the CFR and one or more symbols, e.g., OFDM symbol in the time domain. One or more PDCCHs can be transmitted in a CORESET. The configuration parameters of CORESET can be configured by the network for a UE, including CORESET index, frequency domain resource, CORESET duration, etc. Each CORESET can be indicated with a TCI state. For example, a TCI state set including one or more TCI states can be configured by the RRC signaling, and one of them can be indicated for a CORESET through the MAC control element (CE). The TCI state can be used for indicating quasi-colocated QCL information for the PDCCH transmitted within the CORESET, that is, indicating a reference signal (RS) which is QCLed with demodulation reference signal (DMRS) of the PDCCH transmitted within the CORESET.

One or more search spaces can be configured by the network for a UE. The configuration parameters of a search space can include search space index, associated CORESET index, PDCCH monitoring periodicity and offset, search space duration, PDCCH monitoring pattern within a slot, search space type, etc. In general, there are two types of search spaces: UE-specific search space (USS) and common search space (CSS). A search space type can also indicate the DCI formats that a UE monitors. A search space can be associated with a CORESET. PDCCH monitoring periodicity and offset can indicate the slots on which a UE needs to monitor PDCCH. According to a search space configuration and the associated CORESET configuration, a UE can be configured to monitor corresponding PDCCHs with DCI formats indicated by the search space type on the resources indicated by the CORESET in the slots indicated by the PDCCH monitoring periodicity and offset.

Figure 3:
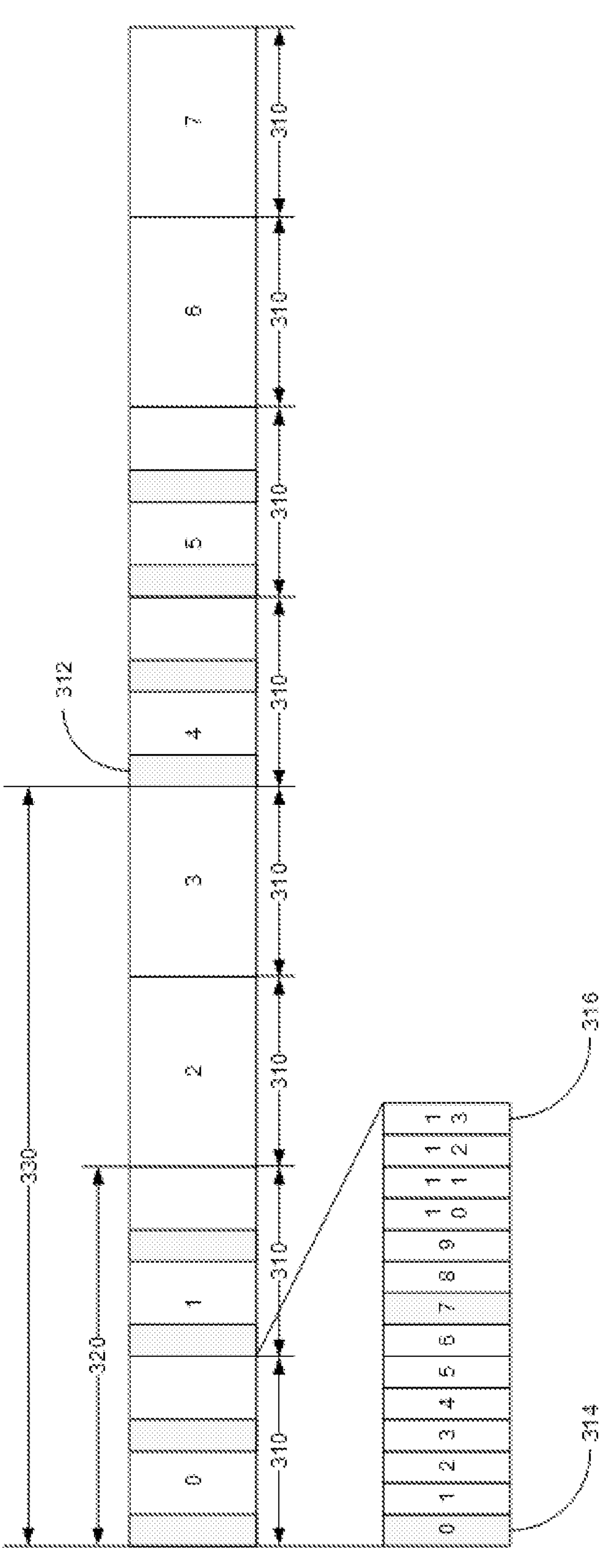
FIG. 3 illustrates a first example system for resource configuration, in accordance with some embodiments.

FIG. 3 illustrates a first example system for resource configuration, in accordance with present implementations. As illustrated by way of example in FIG. 3, an example system 300 includes a plurality of slots 310, a plurality of monitoring occasions (MO) including 312 and 314, at least one OFDM symbol 316, a search space 320 having an example duration of 2 slots, two monitoring occasions within each of the 2 slots per PDCCH monitoring periodicity, and a PDCCH monitoring periodicity having an example duration of 4 slots.

FIG. 3 is diagram illustrating an example of configuration of PDCCH monitoring occasion. Eight slots are illustrated overall (denoted by slot 0-7). PDCCH monitoring periodicity is 4 slots and offset is 0. The search space duration is 2 slots. It is configured that 2 PDCCH monitoring occasions (MOs) in a slot. Therefore, there are totally 4 MOs within one PDCCH monitoring period. On each of MOs, there are one resource configured by CORESET for UE to monitor PDCCH.

In wireless communication system, there are one or more PDCCH candidates in one monitoring occasion. A UE can blind detect the PDCCH among the one or more PDCCH candidates. Each PDCCH candidate has a PDCCH candidate index. A PDCCH candidate includes one or more control-channel elements (CCEs). Each CCE has a CCE index and includes a number of RBs.

In some embodiments, both of UE-specific PDCCH and GC PDCCH can be used for retransmission scheduling of a MBS TB. The UE-specific PDCCH can also be called as point to point transmission (PTP) PDCCH, and the GC PDCCH can also be called as point to multi-point transmission (PTM) PDCCH. A set of HARQ-process can be shared by PTP PDCCH and PTM PDCCH. For a same HARQ-process ID, the value of the NDI in the PTP PDCCH for scheduling the retransmission of multicast TB can be set to be toggled relative to the NDI in the UE's previous PTP PDCCH for scheduling a unicast TB. The value of the NDI in the PTM PDCCH can be set to be toggled relative to the NDI in the UE's previous PTM PDCCH.

In some embodiments, if a PTP PDCCH is used for retransmission scheduling of a MBS TB, the size of information field within PTP PDCCH should be no smaller than the size of this information field within PTM PDCCH. For example, the size of HARQ process number field in PTM PDCCH is 4. Then, the size of HARQ process number field in PTP PDCCH should be at least 4. Then, all the information indicated in the PTM transmission can be indicated via the PTP PDCCH.

In some embodiments, if a PTP PDCCH is used for retransmission scheduling of a MBS TB, the size of information field within PTP PDCCH can be smaller than the size of this information field within PTM PDCCH. Then, only part of MBS transmission scheduled by PTM PDCCH can be retransmitted in a PTP manner, i.e., the retransmission can be scheduled by PTP PDCCH. For example, the size of HARQ process number field in PTM PDCCH is 4. And the size of HARQ process number field in PTP PDCCH is 3. Then, only PTM PDCCH with the HPN within the range of {0-7} can be retransmitted in the PTP manner, due to PTP PDCCH can only indicate HPN within the range of {0-7}.

In SPS-based MBS transmission mode, one or more SPS transmission configurations can be configured via RRC signaling, and a PDCCH can be used for activating the SPS-based MBS transmission. The PDCCH can be called an activation PDCCH. The GC PDSCH can be transmitted according to the SPS transmission configuration configured via the RRC signaling and indicated by the activation PDCCH.

Figure 4:
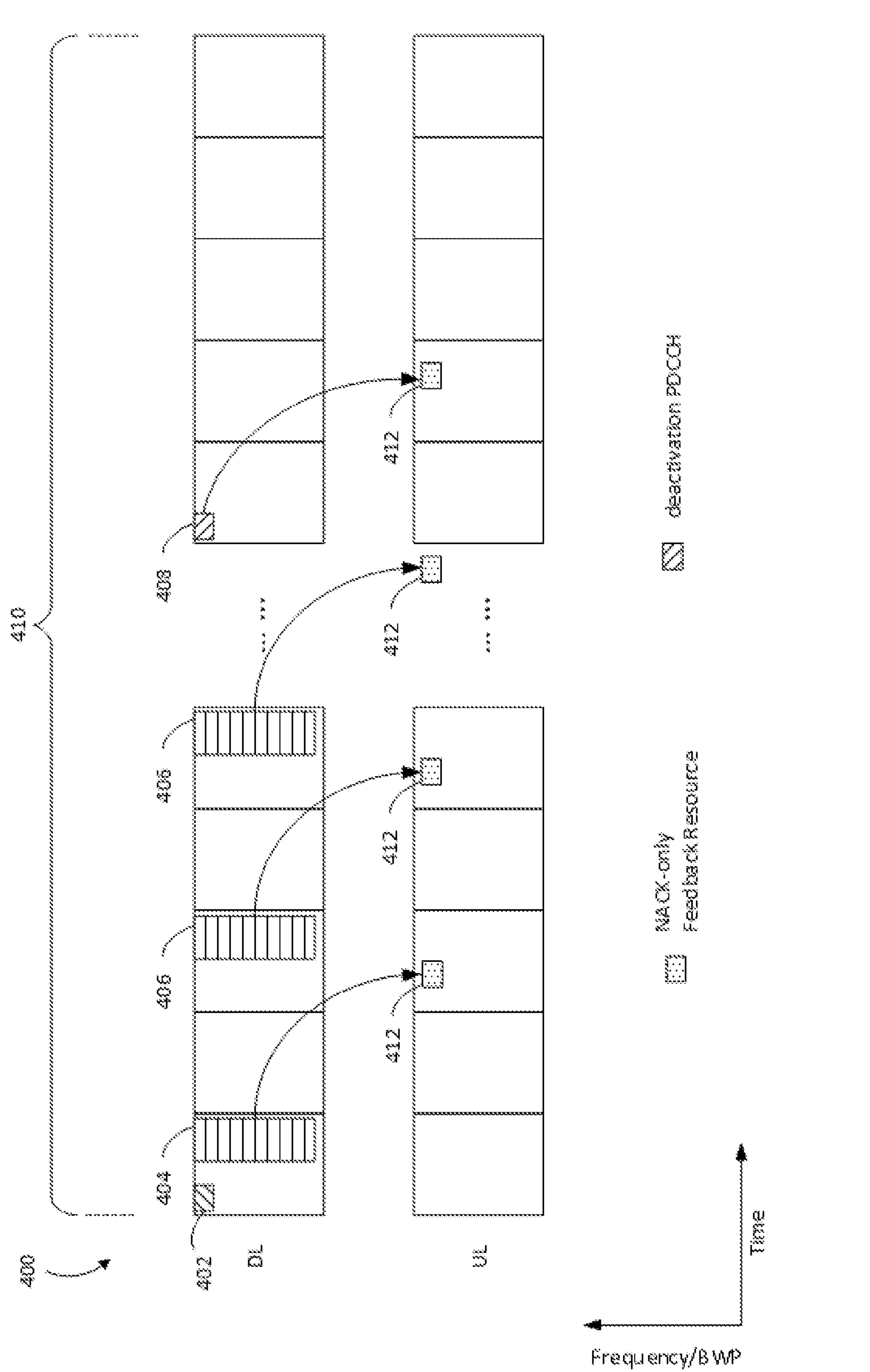
FIG. 4 is a schematic diagram of a first design of a transmission mode, in accordance with some embodiments.

As shown in FIG. 4, the first PDSCH after the activation PDCCH 402 is the SPS PDSCH with scheduling PDCCH 404. The second PDSCH after the activation PDCCH 402 is an SPS PDSCH without scheduling PDCCH 406 (e.g., SPS PDSCH). The SPS PDSCH without scheduling PDCCH 406 is disposed between the activation PDCCH 402 and a deactivation PDCCH (or release PDCCH) 408. The UL slot group includes a plurality of feedback resources 412 (e.g., acknowledgement/negative acknowledgement (ACK/NACK) feedback resource or negative acknowledgement (NACK)-only feedback resource).

For SPS-based MBS transmission mode, if the GC activation PDCCH is mis-detected by one or more UEs within the group, how to retransmit the activation GC PDCCH can be an issue.

Different CORESETs Configured for Activation GC PDCCH and Reactivation PDDCH

In some embodiments, different CORESETs can be configured for activation GC PDCCH and reactivation PDCCH, different TCI state sets can be configured via RRC for different CORESETs, and a MAC layer signaling (e.g., MAC CE) can indicate a TCI state from each TCI state set respectively.

The retransmission of activation GC PDCCH can be called a reactivation PDCCH. The retransmission of the activation GC PDCCH can base on NACK feedback from UE for the activation GC PDCCH or GC PDSCH scheduled by the activation GC PDCCH. Or the retransmission of the activation GC PDCCH can be transmitted to some UEs newly joined into the group to receive the SPS-based MBS transmission. The reactivation PDCCH and the activation GC PDCCH correspond to a same SPS-based MBS transmission.

The reactivation PDCCH can be a UE-specific PDCCH or a GC PDCCH. A CORESET with a different index compared to the index for the activation GC PDCCH can be configured for the reactivation PDCCH. For example, the activation GC PDCCH can correspond to CORESET index 1, and the reactivated PDCCH can correspond to CORESET index 2. The TCI state of CORESET #1 and CORESET #2 can be different.

For example, at least two TCI states sets can be configured via the RRC signaling. For example, two TCI state sets (TCI state set #1 and TCI state set #2) can be configured for the UE. Each TCI state set can contain one or more TCI states, as shown in Table 1. TCI state set #1 can contain four TCI states with index #0~#3, and TCI state set #2 can contain four TCI states with index #4~#7. TCI state set #1 (e.g., TCI state index #2) can correspond to CORESET #1, and the MAC layer signaling (e.g., MAC CE) indicates one TCI state from the TCI state set #1 for CORESET #1. And TCI state set #2 corresponds to CORESET #2, and the MAC CE indicates one TCI state from the TCI state set #2 (e.g., TCI state index #6) for CORESET #2.

For example, the TCI state set configured by the RRC signaling can contain only one TCI state. At this time, this TCI state can serve as the TCI state of the CORESET, without requiring the MAC layer signaling indication.

TABLE 1

| | TCI state set | TCI states within each TCI state set configured via RRC signaling | TCI states indicated MAC layer signaling for activation GC PDCCH and reactivation PDCCH respectively |
|---|---|---|---|
| CORESET#1 for activation GC PDCCH | TCI state set #1 | TCI state index #0<br>TCI state index #1<br>TCI state index #2<br>TCI state index #3 | TCI state index #2 |
| CORESET#2 for Reactivation PDCCH | TCI state set #2 | TCI state index #4<br>TCI state index #5<br>TCI state index #6<br>TCI state index #7 | TCI state index #6 |

Figure 5:
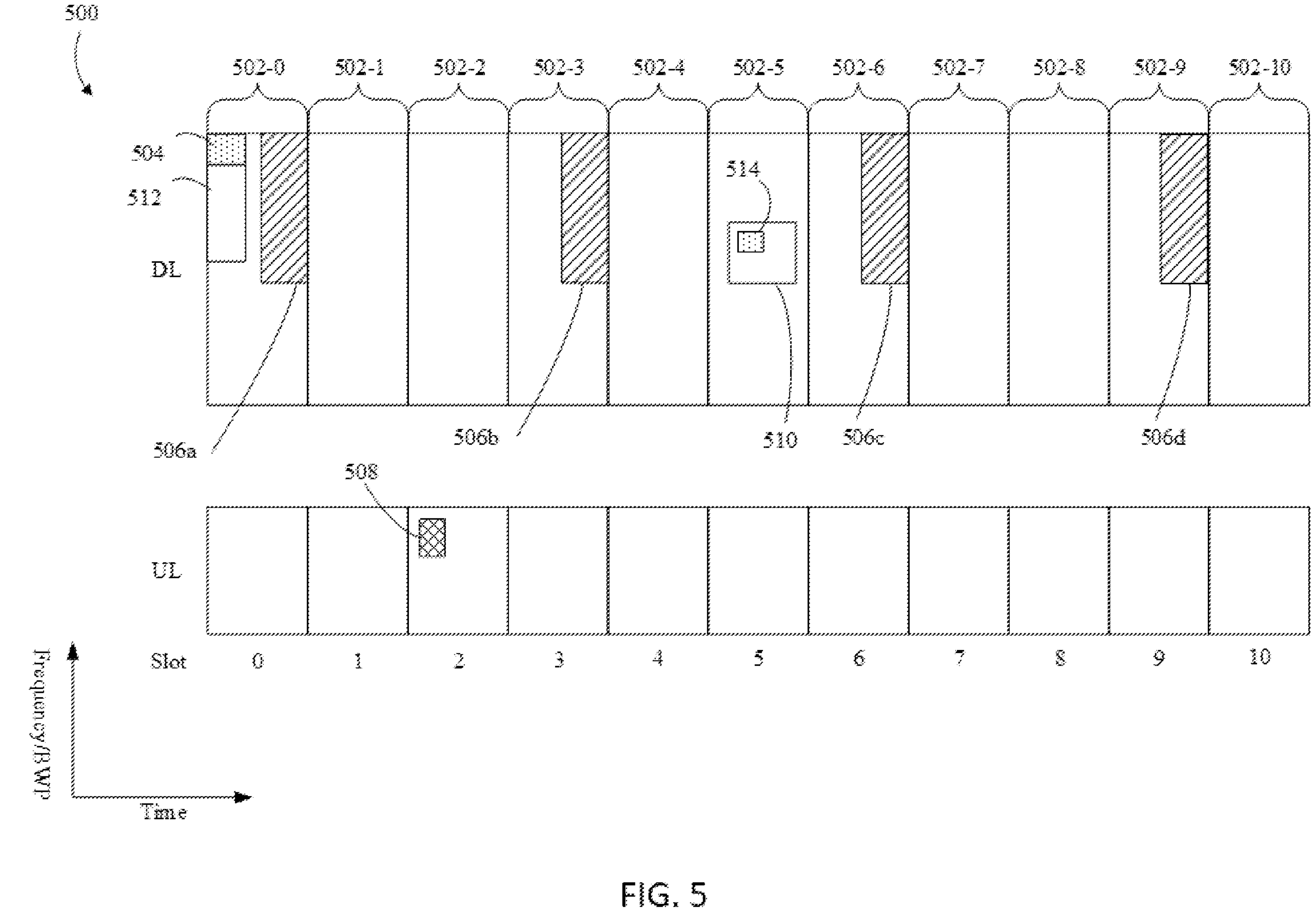
FIG. 5 is a diagram illustrating an example configuration of reactivation PDCCH transmission, according to some embodiments.

FIG. 5 is a diagram illustrating an example configuration 500 of reactivation PDCCH transmission, according to some embodiments. In FIG. 5, the x-axis corresponds to time, and the y-axis corresponds to frequency (e.g., carrier or BWP). The configuration 500 includes eleven slots 502-0, 502-1, 502-2, 502-3, 502-4, 502-5, 502-6, 502-7, 502-8, 502-9, and 502-10 (collectively the slots 502-0-502-10). As illustrated in FIG. 5, the configuration 500 includes a first PDSCH **506*a* disposed in slot 502-0, a second PDSCH 506*b* disposed in slot 502-3, a third PDSCH 506*c* disposed in slot 502-6, and a fourth PDSCH 506*d* disposed in slot 502-9. The slot 502-0 also includes the CORESET for the activation GC PDDCH 512**.

The first PDSCH **506*a* is the first PDSCH transmission activated by the activation GC PDCCH 504 (e.g., PDSCH scheduled by the activation GC PDCCH). The configuration 500 includes an activation GC PDCCH (or first activation PDCCH) 504 disposed in slot 502-0. The slot 502-0 also includes the CORESET 512 for the activation GC PDDCH 504. The activation of the first PDSCH 506*a* can be performed by the first activation PDCCH 504. The feedback timing (e.g., k0) indicated in the first activation PDCCH 504 can equal to 0. The first PDSCH 506*a* can be indicated to feedback 508 (e.g., HARQ-ACK feedback resource) in slot 502-2**.

A UE (e.g., UE1) may not detect the activation GC PDCCH 504 within the configured monitoring occasion (MO) determined by the CORESET 512 and search space configuration for the activation GC PDCCH 504. Then it will feed back a NACK to the base station. The feedback information can be transmitted with the feedback resource corresponding with activation GC PDCCH or PDSCH scheduled by activation GC PDCCH. And the UE will monitor the retransmission of the activation GC PDCCH, e.g., reactivation PDCCH 514 (k0=1) in the PDCCH resource determined by the CORESET 510 and search space configuration for the reactivation PDCCH 514.

The reactivation PDCCH 514 can point to a SPS PDSCH activated by the activation GC PDCCH. As shown in FIG. 5, PDSCH **506*a*, 506*b*, 506*c*, 506*d*, etc. can be the SPS PDSCH activated by the activation GC PDCCH. And the reactivation PDCCH can associate with one of them (e.g., third PDSCH 506*c*). For example, the third PDSCH 506*c* is the PDSCH scheduled by the reactivation PDCCH 514 according to the time or frequency domain resource allocation in the reactivation PDCCH 514**.

The other configuration parameters for the activation GC PDCCH 504 and the reactivation PDCCH 514 can be different or same (the time domain resource of the CORESET, frequency domain resource of the CORESET, search space configuration, Aggregation Level, etc.)

The above method distinguishes the transmission resources or monitoring resources of activation GC PDCCH 504 and reactivation PDCCH 514. Then, for UEs that have successfully received the activation GC PDCCH, they are not necessary to monitor the reactivation PDCCH any more, thus saving the overhead of the UEs. In addition, the TCI state of the reactivation PDCCH can be configured independently. For example, a more suitable TCI state can be configured for UE, which did not detect the activation GC PDCCH. Thus, receiving reliability of the reactivation PDCCH can be improved.

The Reactivation PDCCH can be a UE-Specific PDCCH or a GC PDCCH

The reactivation PDCCH can be a UE-specific PDCCH or a GC PDCCH. The reactivation PDCCH and the activation GC PDCCH can share a CORESET with the same index. There are two or more TCI states associated with the CORESET. For example, a TCI state set including two or more TCI states is configured for the CORESET via a RRC signaling. A MAC layer signaling (e.g., MAC CE) can indicate two TCI states for the CORESET. Then, one can be used for the activation GC PDCCH, and another can be used for the reactivation PDCCH. The mapping between TCI state and activation GC PDCCH or reactivation PDCCH can be predefined or configured.

As an example shown in Table 2, a CORESET #1 can be configured for both activation GC PDCCH and reactivation PDCCH. A TCI state set including several TCI state sets (e.g., eight TCI states with TCI state index #0~#7) can be configured. And two TCI states (e.g., TCI state index #2 and TCI state index #6) can be further indicated by MAC layer signaling (e.g., MAC CE) for activation GC PDCCH and reactivation PDCCH, respectively.

TABLE 2

| | TCI states configured via RRC signaling | TCI states indicated MAC layer signaling for activation GC PDCCH and reactivation PDCCH respectively |
|---|---|---|
| Activation GC PDCCH | TCI state index #0 | TCI state index #2 |
| Reactivation PDCCH | TCI state index #1 | TCI state index #6 |
| | TCI state index #2 | |
| | TCI state index #3 | |
| | TCI state index #4 | |
| | TCI state index #5 | |
| | TCI state index #6 | |
| | TCI state index #7 | |

In some embodiments, some rules can be predefined for the mapping between TCI states indicated by MAC CE and activation GC PDCCH/reactivation PDCCH. For example, the TCI state of the smaller index corresponds to activation GC PDCCH, and the TCI state of the larger index corresponds to reactivation PDCCH. As another example, the first index configured corresponds to activation GC PDCCH, and the second index configured corresponds to reactivation PDCCH. For example, when the indication information can {6, 2}, the first index #6 can correspond to activation GC PDCCH, and the second index #2 can correspond to reactivation PDCCH.

For example, the base station can configure the TCI state index for activation GC PDCCH and reactivation PDCCH with the same value (e.g., {6, 6}), or the base station can configure only one TCI state index (e.g., {6}). In this case, the TCI states of the activation GC PDCCH and the reactivation PDCCH are the same, e.g., TCI state index #6.

As another example shown in Table 3, a CORESET #1 is configured for both activation GC PDCCH and reactivation PDCCH. A TCI state set including several TCI state sets (e.g., eight TCI states with TC state index #0~#7) is configured. And the association relationship between TC state configured via RRC signaling and activation GC PDCCH/reactivation PDCCH is predefined or preconfigured, e.g., TC state indices #0~#3 are associated with the activation GC PDCCH, and TC state indices #4~#7 are associated with the reactivation PDCCH. Then, two TC states (e.g., T state index #2 and ToC state index #6) can be further indicated by MAC layer signaling (e.g., MAC CE). According to the association relationship, TCI state index #2 can correspond to activation GC PDCCH, and TCI state index #6 can correspond to reactivation PDCCH, respectively.

TABLE 3

| | TCI states configured via RRC signaling | TCI states indicated MAC layer signaling for activation GC PDCCH and reactivation PDCCH respectively |
|---|---|---|
| Activation GC PDCCH | TCI state index #0 | TCI state index #2 |
| | TCI state index #1 | |
| | TCI state index #2 | |
| | TCI state index #3 | |
| Reactivation PDCCH | TCI state index #4 | TCI state index #6 |
| | TCI state index #5 | |
| | TCI state index #6 | |
| | TCI state index #7 | |

For example, there may be only one TCI state associated with activation GC PDCCH or reactivation PDCCH configured by the RRC signaling. In this example, this TCI state can serve as the TCI state of the activation GC PDCCH or reactivation PDCCH, without requiring the MAC layer signaling indication.

The other configuration parameters for the activation GC PDCCH and the reactivation PDCCH can be different or same (the time domain resource of the CORESET, frequency domain resource of the CORESET, search space configuration, Aggregation Level, etc.)

In some embodiments, the transmission resources or monitoring resources of activation GC PDCCH and reactivation PDCCH are distinguished. For UEs that have successfully received the activation GC PDCCH, they may not be needed to monitor the reactivation PDCCH anymore, thus saving the overhead of the UEs. In addition, the TCI state of the reactivation PDCCH can be configured independently. For example, a more suitable TCI state can be configured for UE, which does not accurately detect the activation GC PDCCH. Thus, receiving reliability of the reactivation PDCCH can be improved.

Using Monitoring Window for Reactivation PDDCH Monitoring

In some embodiments, a time interval is configured by the base station for the UE. In some embodiments, the time interval can correspond to a PDCCH, an MO, or a PDSCH.

For example, the PDCCH can be an activation GC PDCCH or a reactivation PDCCH, and the MO can be a time frequency domain resource for monitoring the PDCCH. The PDSCH can be a PDSCH scheduled by the PDCCH, e.g., activation GC PDCCH or reactivation PDCCH.

In some embodiment, the time interval can be used to retransmit the PDCCH. For example, the time interval can be defined for monitoring the retransmission PDCCH of the activation GC PDCCH or the reactivation PDCCH.

Figure 6:
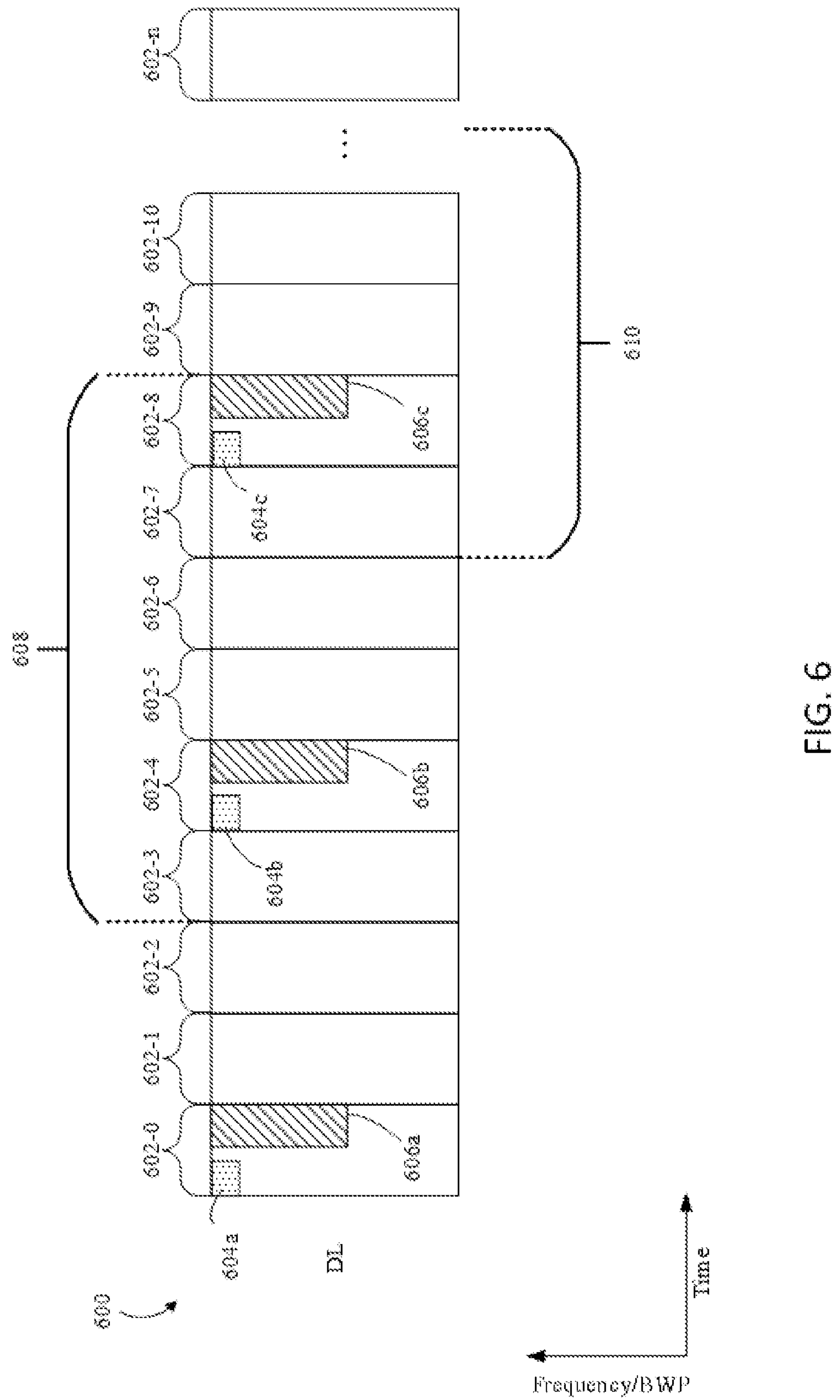
FIG. 6 is a diagram illustrating another example configuration of reactivation PDCCH transmission, according to some embodiments.

FIG. 6 is a diagram illustrating an example configuration 600 of reactivation PDCCH transmission, according to some embodiments. In FIG. 6, the x-axis corresponds to time, and the y-axis corresponds to frequency (e.g., carrier or BWP). The configuration 600 includes slots 602-0, 602-1, 602-2, 602-3, 602-4, 602-5, 602-6, 602-7, 602-8, 602-9, 602-10 . . . **602-*n*, where n is any positive integer (collectively the slots 602). As illustrated in FIG. 6, the configuration 600 includes a first PDSCH 606*a* disposed in slot 602-0, a second PDSCH 606*b* disposed in slot 602-4, and a third PDSCH 606*c* disposed in slot 602-8. The configuration 600 also includes a first MO 604*a* in slot 602-0, a second MO 604*b* in slot 602-4, and a third MO 604*c* in slot 602-8**.

The first to third MOs **604*a*, 604*b*, and 604*c* are configured for monitoring PDCCH, e.g., activation GC PDCCH. If a UE does not accurately detect the PDCCH within the first MO 604*a***, it will feed back NACK on the feedback resource, and monitor the retransmission of the missed PDCCH within a corresponding time interval (monitoring window (MW)).

A starting point of the MW can be determined according to the time domain position of the PDCCH, the MO, or the PDSCH scheduled by the PDCCH or feedback resource for the PDCCH or the PDSCH. And the time domain reference point can be predefined or configured, and a time offset can be indicated for determining the starting point of the MW. As an example in FIG. 6, the time offset between the starting slot the MW and the starting slot of the corresponding MO is 3 in terms of slots. That is, first MO **604*a* is disposed in slot 602-0, and a first MW 608 starts from slot 602-3, which is 3 slots after the slot containing first MO 602-0**. Other predefined reference points are not excluded, such as, the start of the slot containing MO/PDCCH/PDSCH/feedback resource for the PDCCH or the PDSCH, the end of the slot containing MO/PDCCH/PDSCH/feedback resource for the PDCCH or the PDSCH, or the start symbol of MO/PDCCH/PDSCH/feedback resource for the PDCCH or the PDSCH, or the end symbol of MO/PDCCH/PDSCH/feedback resource for the PDCCH or the PDSCH, etc.

Similarly, the second MO **604*b*, which is disposed in slot 602-4, has a corresponding second MW 610 that begins three slots later in slot 602-7. There may be overlapping slots (slots 602-7 and 602-8) between different MWs (e.g., first MW 608 and second MW 610**).

The length of MW can also be configured in granularity of, such as, radio frame, half frame, millisecond, slot, symbol, etc. In FIG. 6, the length of MWs is configured as 6 slots as an example, but embodiments are not limited thereto, and the length of the MWs can be set to any integer less than or greater than 6. The first MW 608 includes slot 602-3 to slot 602-8. Similarly, second MW 610 can include slot 602-7 to 602-12 (not shown). If the UE does not detect the PDCCH within second MO **604*b*, it can monitor the retransmission of the PDCCH according to the retransmission PDCCH monitoring configuration (including CORESET, search space, Aggregation Level, etc.) within second MW 610**.

In some embodiments, if the UE does not detect PDCCH within a MO, it can transmit NACK on the set resource. Then, the base station can determine whether to transmit the retransmission of the PDCCH or not.

In some embodiments, the transmission resources or monitoring resources of activation GC PDCCH and reactivation PDCCH are distinguished. Then, for UEs that have successfully received the activation GC PDCCH, they may not be needed to monitor the reactivation PDCCH anymore, thus saving the overhead of the UEs. In addition, the TCI state of the reactivation PDCCH can be configured independently. For example, a more suitable TCI state can be configured for UE, which may not accurately detect the activation GC PDCCH. Thus, receiving reliability of the reactivation PDCCH can be improved.

Defining Conditions for UE to Start or Stop the Reactivation PDCCH Monitoring

In some embodiments, the UE that has received activation GC PDCCH successfully stops monitoring the reactivation PDCCH within the MO determined by the CORESET and search space configuration.

If a UE does not start to receive SPS-based service, it can monitor both of the activation GC PDCCH and reactivation PDCCH according to their CORESETs and search space configurations.

For a UE that has already started to receive the SPS-based service activated by activation GC PDCCH (e.g., UE has successfully received the activation PDCCH), the UE may only need to monitor PDCCH according to the configuration of CORESET/search space corresponding to the activation GC PDCCH.

After the UE failure to receive a certain PDSCH activated by activation GC PDCCH, the UE can feed back NACK on the set feedback resource. And the UE can monitor the reactivation PDCCH according to the configuration of CORESET/search space corresponding to the reactivation PDCCH.

In some embodiments, the transmission resources or monitoring resources of activation GC PDCCH and reactivation PDCCH can be distinguished, and various conditions for reactivation PDCCH monitoring can occur. Then, for UEs that have successfully received the activation GC PDCCH, they may not be needed to monitor the reactivation PDCCH anymore, thus saving the overhead of the UEs. In addition, the TCI state of the reactivation PDCCH can be configured independently. For example, a more suitable TCI state can be configured for UE, which may not accurately detect the activation GC PDCCH. Thus, receiving reliability of the reactivation PDCCH can be improved.

Calculate BD/CCE Number Dynamically According to the Reactivation PDCCH Monitoring Conditions In some embodiments, the BD number or the CCE number can be detected by a UE within a slot or a span or a MO have a upper limit (e.g., a BD budget and/or a CCE budget). For example, when the BD budget is 44 within a slot, at most 44 BD can be performed by the UE within the slot. Then, if configured number of BD is larger than 44, the monitoring on part of search space or candidates with lower priority may not be performed. A PDCCH priority (or search space priority) can be related with search space type and index. For example, PDCCH in CSS can have the highest priority, and the UE can monitor the PDCCH in CSS. The priority of PDCCH in UE USS can be determined according to the search space index, and a low search space index can have a high monitoring priority.

Figure 7:
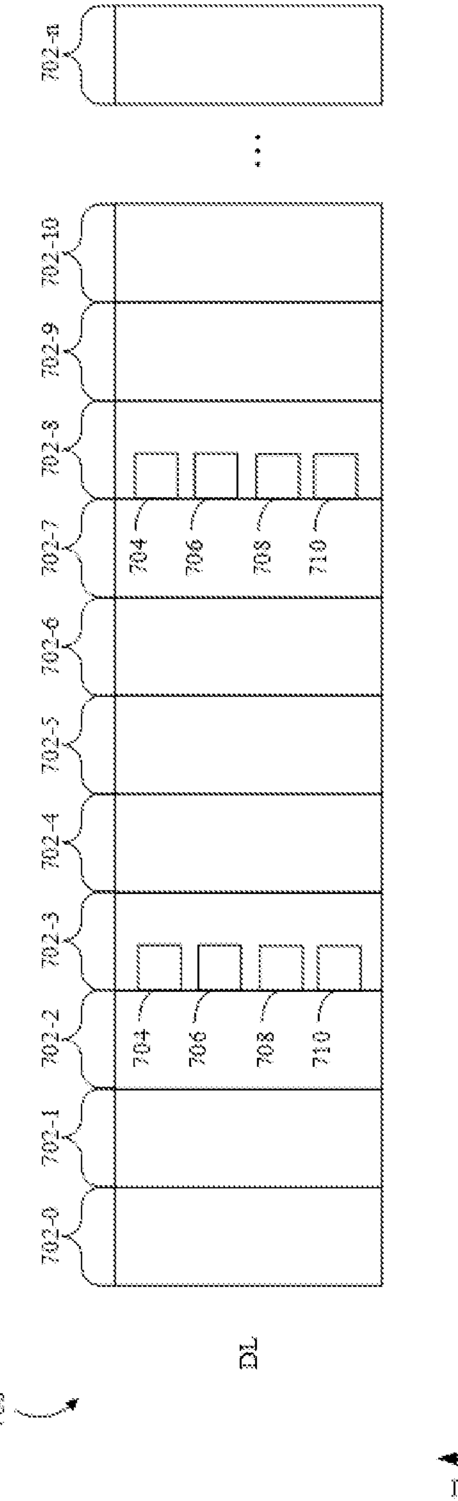
FIG. 7 is a diagram illustrating another example configuration of reactivation PDCCH transmission, according to some embodiments.

FIG. 7 is a diagram illustrating an example configuration 700 of reactivation PDCCH transmission, according to some embodiments. In FIG. 7, the x-axis corresponds to time, and the y-axis corresponds to frequency (e.g., carrier or BWP).

The configuration 700 includes slots 702-0, 702-1, 702-2, 702-3, 702-4, 702-5, 702-6, 702-7, 702-8, 702-9, 702-10 . . . 702-*n*, where n is any positive integer (collectively the slots 702). As illustrated in FIG. 7, the configuration 700 includes a first USS 704 disposed in slots 702-3 and 702-8, a second USS 706 disposed in slots 702-3 and 702-8, a first CSS 708 disposed in slots 702-3 and 702-8, and a second CSS 710 disposed in slots 702-3 and 702-8. The reactivation PDCCH can be monitored within the MW, e.g., slot 702-3 to slot 702-8. The second CSS 710 can be a type of search space for reactivation PDCCH (or CSS for reactivation PDCCH).

For both slot 702-3 and slot 702-8, the CSS for reactivation PDCCH can be configured in or a configuration of the CORESET and search space for the reactivation PDCCH monitoring. The first USS 704 can have a higher priority than the second USS 706. For the second CSS 710, 16 BDs can be configured according to the candidate configuration. For the first CSS 708, another 16 BDs can be configured. For the first USS 704, 8 BDs can be used for performing. For the second USS 706, 16 BDs can be used. Although a specific number of BDs are described with respect to the first and second USS 704, 706 and first and second CSS 708, 710, embodiments are not limited thereto, and more or fewer BDs can be configured depending on embodiments.

In slot 702-3, the reactivation PDCCH in second CSS 710 can be monitored. The PDCCH in slot 702-6 may not be monitored as the number of BDs may exceed the BD budget, e.g., 16+16+8+16=56>44. In some embodiments, the PDCCH in the lower priority search space (i.e., USS2) may not be monitored.

In slot 702-8, the reactivation PDCCH in second CSS 710 may not be monitored. And the PDCCH in second USS 706 can also be monitored as it does not reach BD budget, e.g., 16+8+16=40<44.

TABLE 4

| Number of BDs that can be performed | Slot 702-3 | Slot 702-8 |
|---|---|---|
| First CSS 708 | 16 | 16 |
| Second CSS 710 | 16 | 0 |
| First USS 704 | 8 | 8 |
| Second USS 706 | 0 | 16 |

In some embodiments, the BD/CCE numbers can be calculated dynamically. For the slot that the reactivation PDCCH does not need to be monitored, BD/CCE overhead can be saved and some PDCCHs in search space with lower priority can monitor, which can reduce the blocking rate of the PDCCH. Furthermore, the UE can save more energy by doing a more reasonable monitoring.

In some embodiments, a method for transmitting (or retransmitting) the activation GC PDCCH is disclosed. Different CORESETs can be configured for activation GC PDCCH and reactivation PDCCH, and different TCI state sets are configured via RRC for different CORESETs. MAC layer signaling can indicate a TCI state from each TCI state set respectively.

In some embodiments, another method for transmitting (or retransmitting) the activation GC PDCCH is disclosed. The same CORESET is configured for both of the activation GC PDCCH and reactivation PDCCH. A TCI state set is configured via RRC for the CORESET. A MAC layer signaling (e.g., MAC CE) can indicate two TCI states from the TCI state set for activation GC PDCCH and reactivation PDCCH respectively. The mapping between TCI states indicated by MAC CE and activation GC PDCCH/reactivation PDCCH can be predefined or configured. Or the mapping between TCI states configured by RRC signaling and activation GC PDCCH/reactivation PDCCH can be predefined or configured.

In some embodiments, a method for transmitting (or retransmitting) the activation GC PDCCH can include defining a MW for reactivation PDCCH monitoring.

In some embodiments, a method for transmitting (or retransmitting) the activation GC PDCCH can include defining conditions for UE to start or stop the reactivation PDCCH monitoring.

In some embodiments, a method for transmitting (or retransmitting) the activation GC PDCCH can include calculating BD/CCE numbers dynamically according to the reactivation PDCCH monitoring conditions.

The disclosed methods can distinguish the transmission resources or monitoring resources of activation GC PDCCH and reactivation PDCCH and define conditions for reactivation PDCCH monitoring. Then, for UEs that have successfully received the activation GC PDCCH, the UEs may not be necessary to monitor the reactivation PDCCH any more, thus saving the overhead of the UEs.

In addition, the TCI state of the reactivation PDCCH can be configured independently. For example, a more suitable TCI state can be configured for UE, which may not detect or may not accurately detect the activation GC PDCCH. Thus, receiving reliability of the reactivation PDCCH can be improved.

Furthermore, by calculating BD/CCE number dynamically, for the slot that the reactivation PDCCH does not need to be monitored, BD/CCE overhead can be saved and some PDCCHs in search space with lower priority can have a possibility for monitoring, which can reduce the blocking rate of the PDCCH.

FIGS. 8-15 illustrate flow charts of example wireless communication processes, in accordance with some embodiments. Although each of the flow charts show a certain order, embodiments are not limited thereto, and the order of operations of the processes may be changed in any suitable manner.

Figure 8:
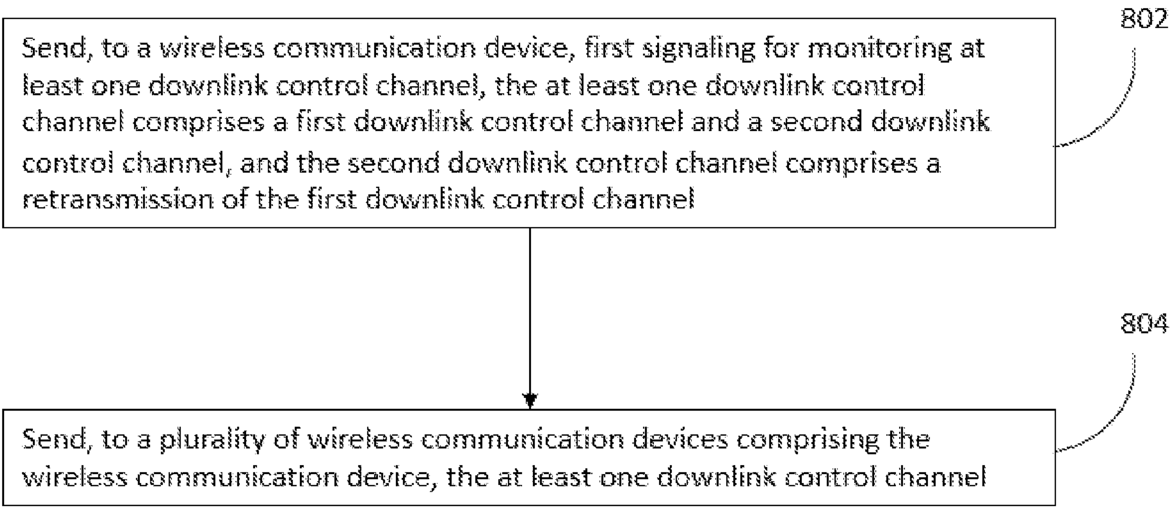
FIGS. 8, 9, 10, 11, 12, 13, 14, and 15 illustrate flow charts of example wireless communication processes in accordance with some embodiments of the present disclosure.

FIG. 8 illustrates a flow chart of an example wireless communication process 800 according to some embodiments. The process 800 is performed by the TRP. The process 800 sending, to a wireless communication device, first signaling for monitoring at least one downlink control channel (802). The at least one downlink control channel includes a first downlink control channel and a second downlink control channel, and the second downlink control channel includes a retransmission of the first downlink control channel. The process 800 includes sending, to a plurality of wireless communication devices including the wireless communication device, the at least one downlink control channel (804).

Figure 9:
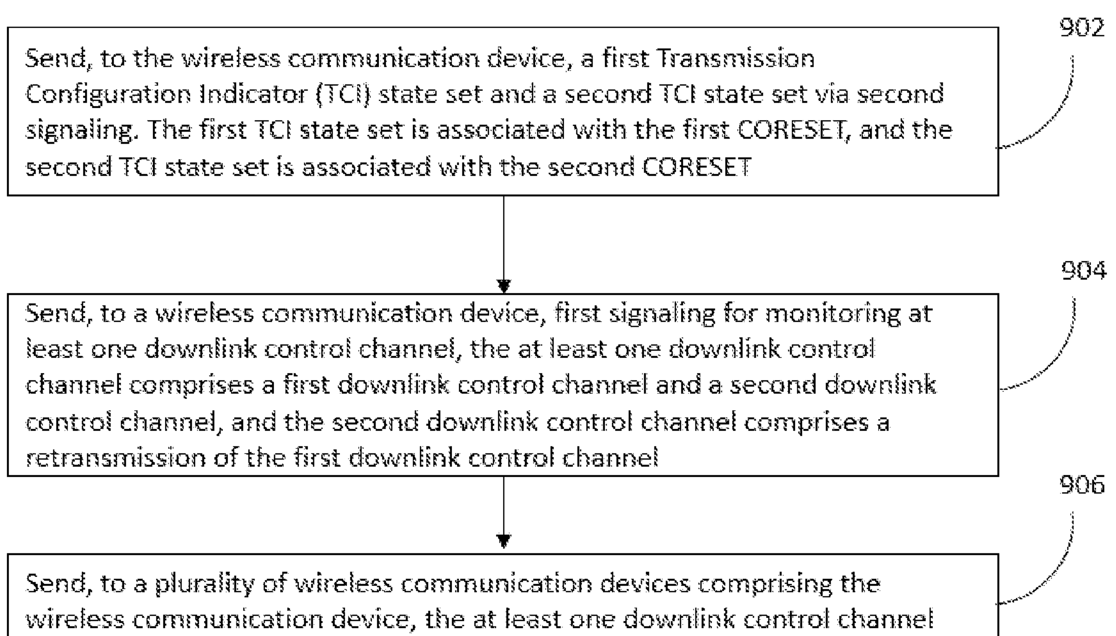

FIG. 9 illustrates a flow chart of an example wireless communication process 900 according to some embodiments. The process 900 is performed by the TRP. The process 900 includes sending, to the wireless communication device, a first TCI state set and a second TCI state set via second signaling (902). The first TCI state set is associated with the first CORESET, and the second TCI state set is associated with the second CORESET. The process 900 includes sending, to a wireless communication device, first signaling for monitoring at least one downlink control channel (904). The at least one downlink control channel includes a first downlink control channel and a second downlink control channel, and the second downlink control channel includes a retransmission of the first downlink control channel. The process 900 includes sending, to a plurality of wireless communication devices including the wireless communication device, the at least one downlink control channel (906).

Figure 10:
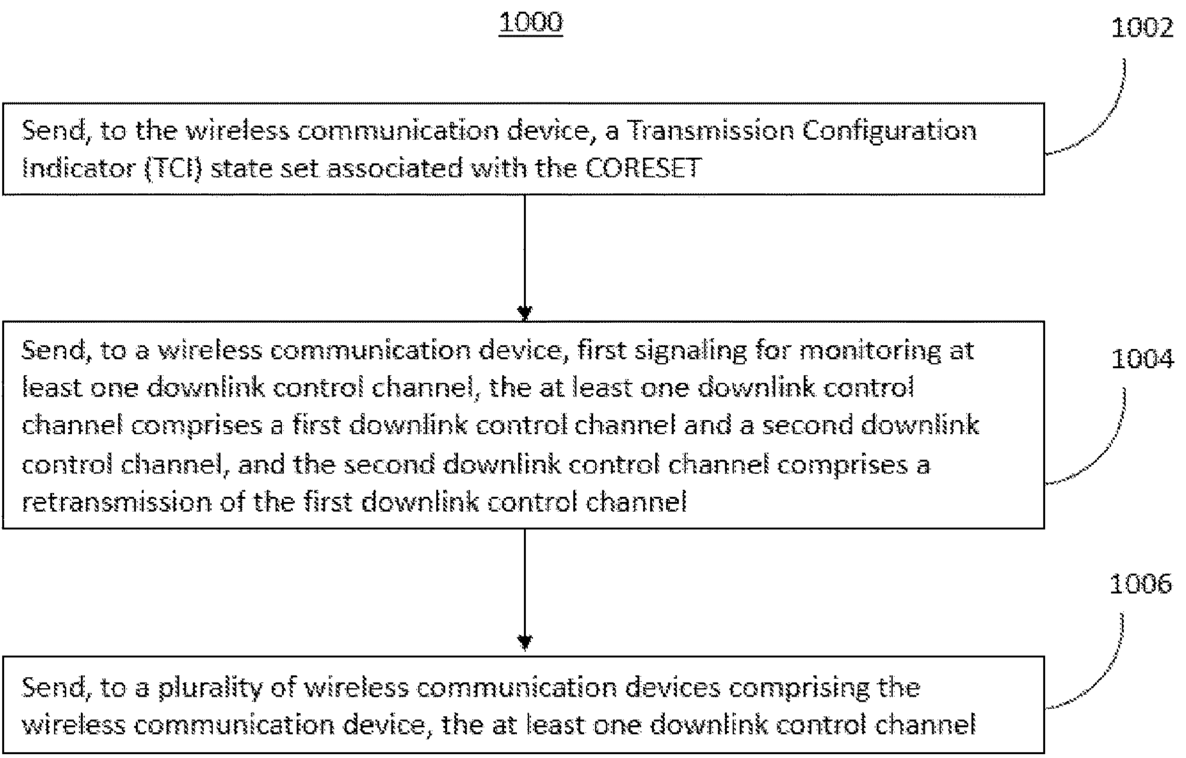

FIG. 10 illustrates a flow chart of an example wireless communication process 1000 according to some embodiments. The process 1000 is performed by the TRP. The process 1000 includes sending, to the wireless communication device, a TCI state set associated with the CORESET (1002). The process 1000 includes sending, to a wireless communication device, first signaling for monitoring at least one downlink control channel (1004). The at least one downlink control channel includes a first downlink control channel and a second downlink control channel, and the second downlink control channel includes a retransmission of the first downlink control channel. The process 1000 includes sending, to a plurality of wireless communication devices including the wireless communication device, the at least one downlink control channel (1006).

Figure 11:
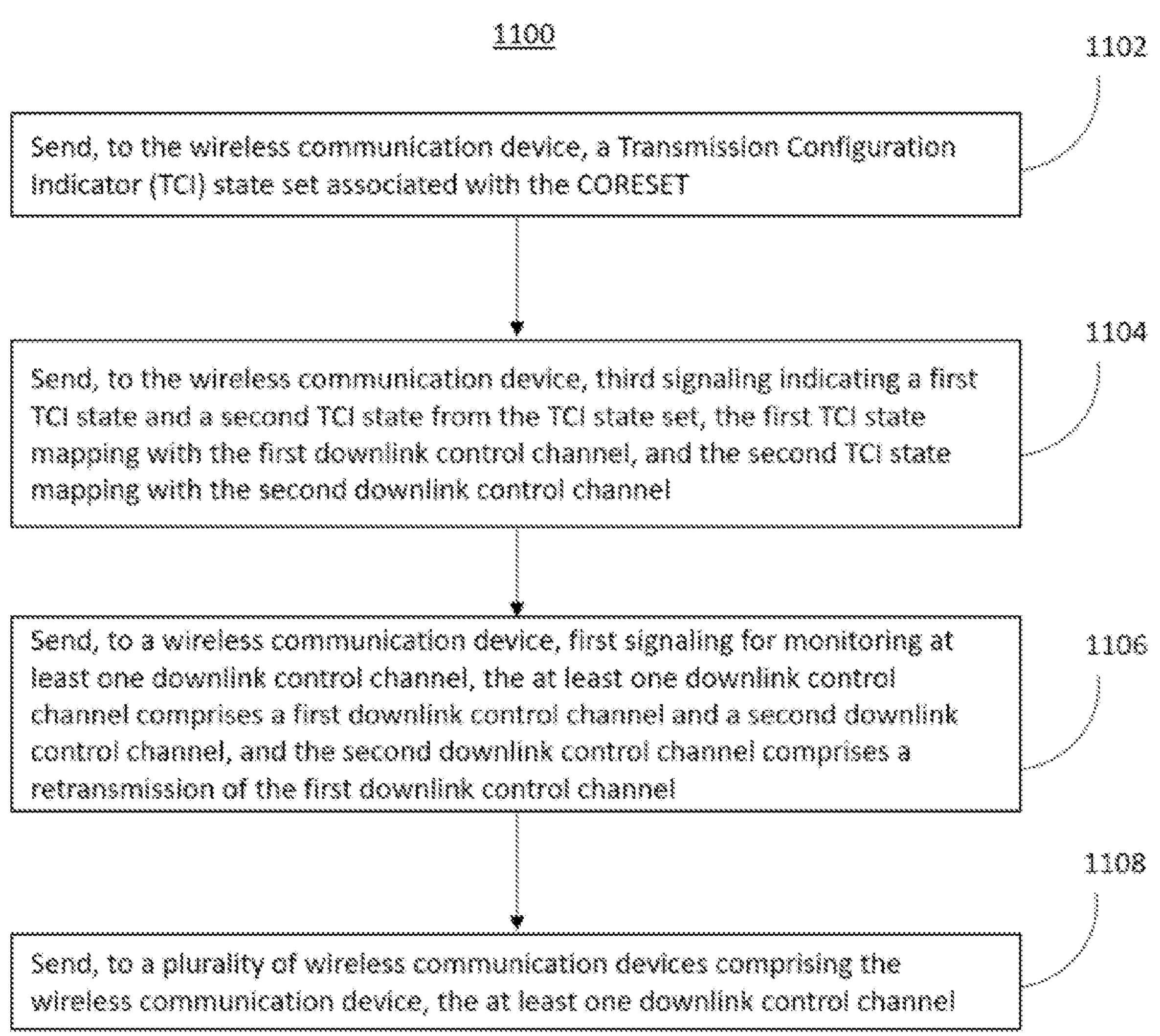

FIG. 11 illustrates a flow chart of an example wireless communication process 1100 according to some embodiments. The process 1100 is performed by the TRP. The process 1100 includes sending, to the wireless communication device, a TCI state set associated with the CORESET (1102). The process 1100 includes sending, to the wireless communication device, third signaling indicating a first TCI state and a second TCI state from the TCI state set (1104). The first TCI state maps with the first downlink control channel, and the second TCI state maps with the second downlink control channel. The process 1100 includes sending, to a wireless communication device, first signaling for monitoring at least one downlink control channel (1106). The at least one downlink control channel includes a first downlink control channel and a second downlink control channel, and the second downlink control channel includes a retransmission of the first downlink control channel. The process 1100 includes sending, to a plurality of wireless communication devices including the wireless communication device, the at least one downlink control channel (1108).

Figure 12:
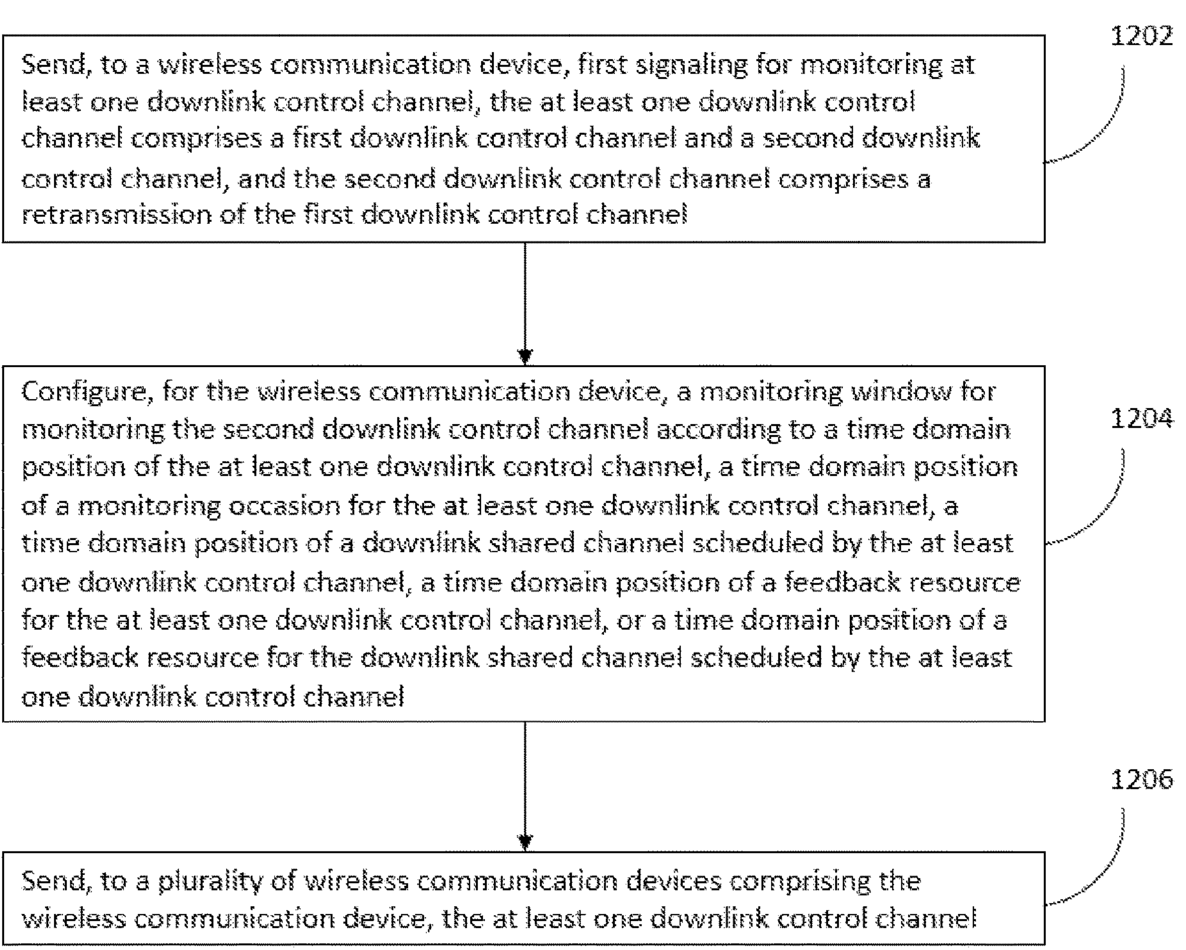

FIG. 12 illustrates a flow chart of an example wireless communication process 1200 according to some embodiments. The process 1200 is performed by the TRP. The process 1200 includes sending, to a wireless communication device, first signaling for monitoring at least one downlink control channel (1202). The at least one downlink control channel includes a first downlink control channel and a second downlink control channel, and the second downlink control channel includes a retransmission of the first downlink control channel. The process 1200 includes configuring, for the wireless communication device, a monitoring window for monitoring the second downlink control channel according to a time domain position of the at least one downlink control channel, a time domain position of a monitoring occasion for the at least one downlink control channel, a time domain position of a downlink shared channel scheduled by the at least one downlink control channel, a time domain position of a feedback resource for the at least one downlink control channel, or a time domain position of a feedback resource for the downlink shared channel scheduled by the at least one downlink control channel (1204). The process 1200 includes sending, to a plurality of wireless communication devices including the wireless communication device, the at least one downlink control channel (1206).

Figure 13:
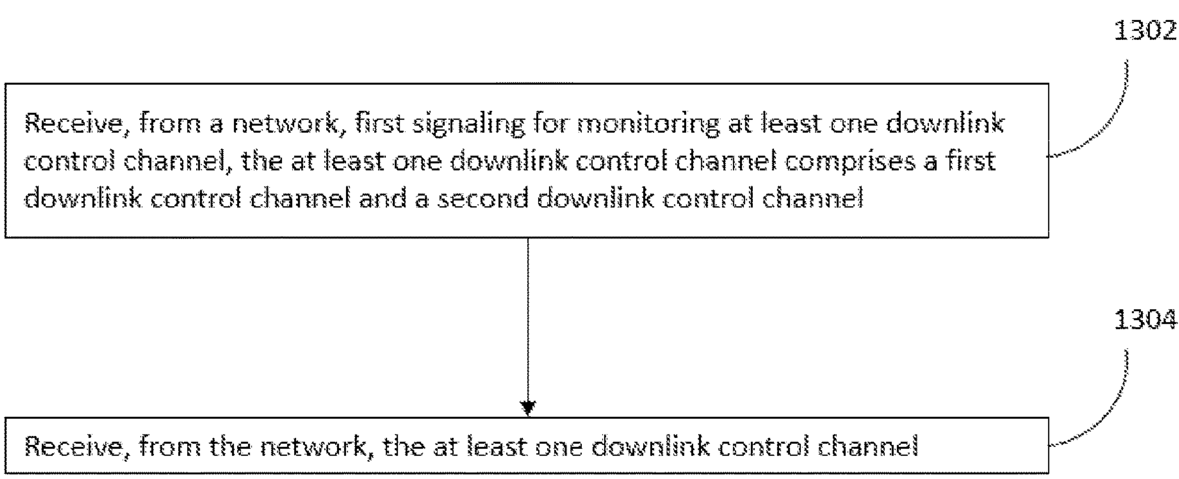

FIG. 13 illustrates a flow chart of an example wireless communication process 1300 according to some embodiments. The process 1300 is performed by the UE. The process 1300 includes receiving, from a network, first signaling for monitoring at least one downlink control channel, the at least one downlink control channel includes a first downlink control channel and a second downlink control channel (1302). The process 1300 includes receiving, from the network, the at least one downlink control channel (1304).

Figure 14:
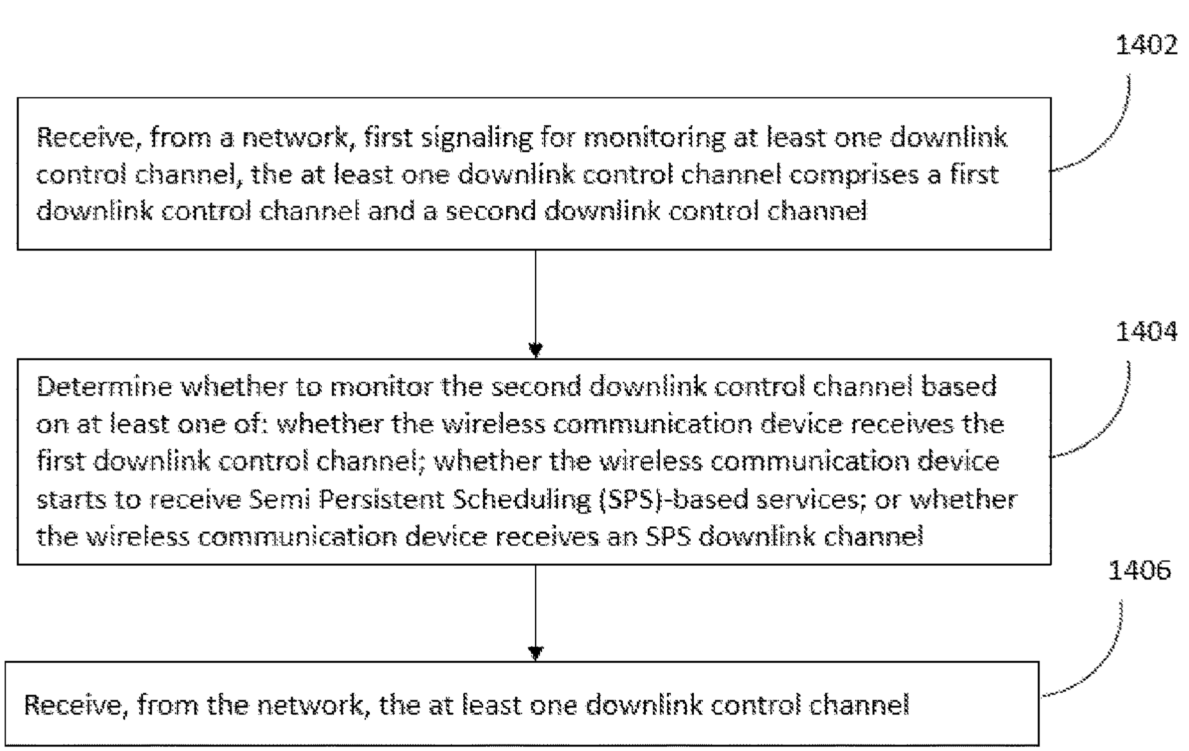

FIG. 14 illustrates a flow chart of an example wireless communication process 1400 according to some embodiments. The process 1400 is performed by the UE. The process 1400 includes receiving, from a network, first signaling for monitoring at least one downlink control channel, the at least one downlink control channel includes a first downlink control channel and a second downlink control channel (1402). The process 1400 includes determining whether to monitor the second downlink control channel based on at least one of: whether the wireless communication device receives the first downlink control channel; whether the wireless communication device starts to receive SPS-based services; or whether the wireless communication device receives an SPS downlink channel (1404). The process 1400 includes receiving, from the network, the at least one downlink control channel (1406).

Figure 15:
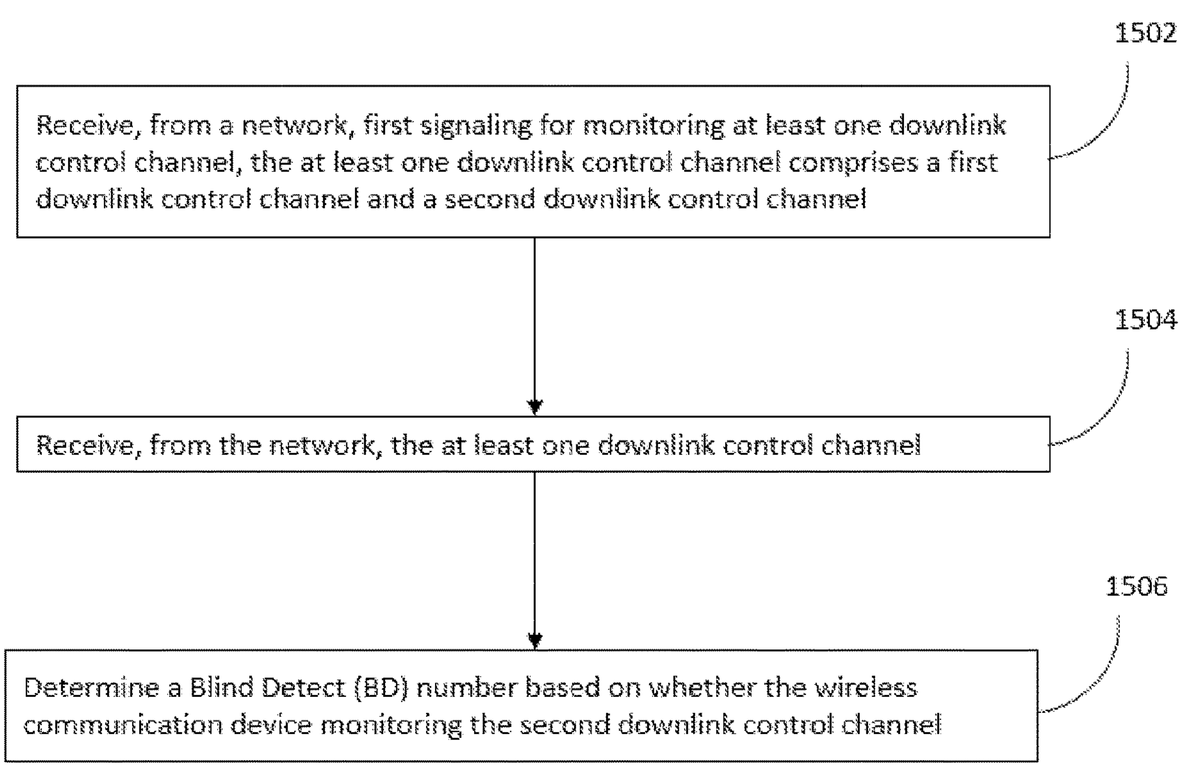

FIG. 15 illustrates a flow chart of an example wireless communication process 1500 according to some embodiments. The process 1500 is performed by the UE. The process 1500 includes receiving, from a network, first signaling for monitoring at least one downlink control channel, the at least one downlink control channel includes a first downlink control channel and a second downlink control channel (1502). The process 1500 includes receiving, from the network, the at least one downlink control channel (1504). The process 1500 includes determining a BD number based on whether the wireless communication device monitoring the second downlink control channel (1506).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules. However, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:

sending, by a network to a wireless communication device, first signaling comprising a Control Resource Set (CORESET) for monitoring at least one downlink control channel, the at least one downlink control channel comprises a first downlink control channel and a second downlink control channel, wherein the second downlink control channel comprises a retransmission of the first downlink control channel;

sending, by the network to the wireless communication device, a Transmission Configuration Indicator, TCI, state set associated with the CORESET;

sending, by the network to the wireless communication device, third signaling indicating a first TCI state and a second TCI state from the TCI state set, wherein the first TCI state maps with the first downlink control channel, and the second TCI state maps with the second downlink control channel, a mapping between the first and second TCI states with the first downlink control and the second downlink control channel is predefined or configured by the network; and sending, by the network to a plurality of wireless communication devices comprising the wireless communication device, the at least one downlink control channel.

2. The wireless communication method of claim 1, wherein the first CORESET corresponds with the first downlink control channel for the wireless communication device; and the second CORESET corresponds with the second downlink control channel for the wireless communication device.

3. The wireless communication method of claim 2, wherein the first downlink control channel is an activation GC Physical Downlink Control Channel (PDCCH);

the second downlink control channel is a reactivation PDCCH; and reactivation PDCCH is common to the plurality of wireless communication devices or specific to the wireless communication device.

4. The wireless communication method of claim 2, further comprising sending, by the network to the wireless communication device, a first Transmission Configuration Indicator (TCI) state set and a second TCI state set via second signaling, wherein the first TCI state set is associated with the first CORESET; and the second TCI state set is associated with the second CORESET.

5. The wireless communication method of claim 4, further comprising sending, by the network to the wireless communication device, third signaling indicating a first TCI state from the first TCI state set and a second TCI state from the second TCI state set.

6. The wireless communication method of claim 5, wherein the second signaling comprises Radio Resource Control (RRC) signaling; and the third signaling comprises Media Access Control (MAC) layer signaling or downlink control information (DCI).

7. The wireless communication method of claim 1, wherein the same CORESET corresponds with the first downlink control channel and the second downlink control channel for the wireless communication device.

8. The wireless communication method of claim 1, further comprising configuring, by the network for the wireless communication device, a monitoring window for monitoring the second downlink control channel according to a time domain position of the at least one downlink control channel, a time domain position of a monitoring occasion for the at least one downlink control channel, a time domain position of a downlink shared channel scheduled by the at least one downlink control channel, a time domain position of a feedback resource for the at least one downlink control channel, or a time domain position of a feedback resource for the downlink shared channel scheduled by the at least one downlink control channel.

9. The wireless communication method of claim 1, wherein the wireless communication device starts or stops monitoring the second downlink control channel based on at least one of:

whether the wireless communication device receives the first downlink control channel;

whether the wireless communication device starts to receive Semi Persistent Scheduling (SPS)-based services; or whether the wireless communication device receives an SPS downlink channel.

10. The wireless communication method of claim 1, wherein the wireless communication device determines a Blind Detect (BD) number based on whether the wireless communication device is monitoring the second downlink control channel.

11. A wireless communication method, comprising:

receiving, by a wireless communication device from a network, first signaling comprising a Control Resource Set (CORESET) for monitoring at least one downlink control channel, the at least one downlink control channel comprises a first downlink control channel and a second downlink control channel, wherein the second downlink control channel comprises a retransmission of the first downlink control channel;

receiving, by the wireless communication device from the network, a Transmission Configuration Indicator, TCI, state set associated with the CORESET;

receiving, by the wireless communication device from the network, third signaling indicating a first TCI state and a second TCI state from the TCI state set, wherein the first TCI state maps with the first downlink control channel, and the second TCI state maps with the second downlink control channel, a mapping between the first and second TCI states with the first downlink control and the second downlink control channel is predefined or configured by the network; and receiving, by the wireless communication device from the network, the at least one downlink control channel.

12. The wireless communication method of claim 11, wherein the first CORESET corresponds with the first downlink control channel for the wireless communication device; and the second CORESET corresponds with the second downlink control channel for the wireless communication device.

13. The wireless communication method of claim 11, wherein the same CORESET corresponds with the first downlink control channel and the second downlink control channel for the wireless communication device.

14. The wireless communication method of claim 11, wherein the wireless communication device is configured by the network a monitoring window for monitoring the second downlink control channel according to a time domain position of the at least one downlink control channel, a time domain position of a monitoring occasion for the at least one downlink control channel, a time domain position of a downlink shared channel scheduled by the at least one downlink control channel, a time domain position of a feedback resource for the at least one downlink control channel, or a time domain position of a feedback resource for the downlink shared channel scheduled by the at least one downlink control channel.

15. The wireless communication method of claim 11, further comprising determining, by the wireless communication device, whether to monitor the second downlink control channel based on at least one of:

whether the wireless communication device receives the first downlink control channel;

whether the wireless communication device starts to receive Semi Persistent Scheduling (SPS)-based services; or whether the wireless communication device receives an SPS downlink channel.

16. A network node, comprising:

at least one processor configured to:

send, via a transmitter to a wireless communication device, first signaling comprising a Control Resource Set (CORESET) for monitoring at least one downlink control channel, the at least one downlink control channel comprises a first downlink control channel and a second downlink control channel, wherein the second downlink control channel comprises a retransmission of the first downlink control channel;

sending, via the transmitter to the wireless communication device, a Transmission Configuration Indicator, TCI, state set associated with the CORESET;

sending, via the transmitter to the wireless communication device, third signaling indicating a first TCI state and a second TCI state from the TCI state set, wherein the first TCI state maps with the first downlink control channel, and the second TCI state maps with the second downlink control channel, a mapping between the first and second TCI states with the first downlink control and the second downlink control channel is predefined or configured by the network; and send, via the transmitter to a plurality of wireless communication devices comprising the wireless communication device, the at least one downlink control channel.

17. A wireless communication device, comprising:

at least one processor configured to:

receive, via a receiver from a network, first signaling comprising a Control Resource Set (CORESET) for monitoring at least one downlink control channel, the at least one downlink control channel comprises a first downlink control channel and a second downlink control channel, wherein the second downlink control channel comprises a retransmission of the first downlink control channel;

receive, via the receiver from the network, a Transmission Configuration Indicator, TCI, state set associated with the CORESET;

receive, via the receiver from the network, third signaling indicating a first TCI state and a second TCI state from the TCI state set, wherein the first TCI state maps with the first downlink control channel, and the second TCI state maps with the second downlink control channel, a mapping between the first and second TCI states with the first downlink control and the second downlink control channel is predefined or configured by the network; and receive, via the receiver from the network, the at least one downlink control channel.

* * * * *